(12) United States Patent
Sollich

(10) Patent No.: US 8,336,564 B2
(45) Date of Patent: Dec. 25, 2012

(54) METHOD AND APPARATUS FOR CLEANING A COATING MACHINE

(75) Inventor: Thomas Sollich, Kalletal (DE)

(73) Assignee: Sollich KG (DE)

( * ) Notice: Subject to any disclaimer, the term of this patent is extended or adjusted under 35 U.S.C. 154(b) by 2172 days.

(21) Appl. No.: 11/315,550

(22) Filed: Dec. 22, 2005

(65) Prior Publication Data

US 2006/0137722 A1    Jun. 29, 2006

(30) Foreign Application Priority Data

Dec. 23, 2004  (DE) .................. 10 2004 062 137

(51) Int. Cl.
*B08B 3/04*  (2006.01)

(52) U.S. Cl. ....... 134/129; 134/95.2; 134/105; 134/124; 134/131

(58) Field of Classification Search .......... None
See application file for complete search history.

(56) References Cited

U.S. PATENT DOCUMENTS

| | | | | |
|---|---|---|---|---|
| 2,612,851 A | * | 10/1952 | Morrison | 425/94 |
| 4,029,116 A | * | 6/1977 | Beyer | 134/167 R |
| 5,220,935 A | * | 6/1993 | Bailey et al. | 134/102.1 |
| 5,437,723 A | | 8/1995 | Sollich | 118/21 |
| 5,860,412 A | * | 1/1999 | Way | 126/299 E |
| 6,348,105 B1 | | 2/2002 | Heyde et al. | 134/19 |
| 6,397,923 B1 | * | 6/2002 | Peting et al. | 164/132 |
| 6,401,650 B1 | * | 6/2002 | Heyde | 118/13 |
| 2004/0099286 A1 | | 5/2004 | Mann | 134/10 |

FOREIGN PATENT DOCUMENTS

| | | |
|---|---|---|
| DE | 3710537 A1 | 10/1988 |
| DE | 4243814 | 12/1992 |
| DE | 19848766 | 10/1998 |

* cited by examiner

*Primary Examiner* — Michael Kornakov
*Assistant Examiner* — Ryan Coleman
(74) *Attorney, Agent, or Firm* — Thomas Horstemeyer, LLP

(57) ABSTRACT

An apparatus serves for cleaning a coating machine for coating confectionery products with a coating mass. The apparatus is designed to be arranged in the coating machine which includes a rotatingly driven grating belt. The grating belt is designed and arranged to support confectionery products to be coated. The grating belt defines a grating belt plane. The apparatus includes a cart. The cart is designed to be moved back and forth in the coating machine above the grating belt plane in the mounted position of said cart in the coating machine. The cart includes a plurality of spraying nozzles. The spraying nozzles are designed and arranged to spray pressurized hot water onto the coating machine in an automatically controlled way.

23 Claims, 4 Drawing Sheets

METHOD AND APPARATUS FOR CLEANING A COATING MACHINE

CROSS REFERENCE TO RELATED APPLICATIONS

This application claims priority to co-pending German Patent Application No. DE 10 2004 062 137.3 entitled "Verfahren und Vorrichtung zum Reinigen einer Überziehmaschine", filed Dec. 23, 2004.

FIELD OF THE INVENTION

The present invention generally relates to a method and an apparatus for cleaning a coating machine with hot water. The present invention also relates to a cleanable coating machine.

Such a coating machine especially processes chocolate masses and other coating masses for coating confectionery products. Especially, tempered chocolate mass is directed onto articles to be coated with the chocolate mass, the articles being transported through the coating machine on a grating belt. The chocolate mass flows with a surplus through the coating machine, it drips down from above onto the articles to be coated and partly through the grating belt, and it thus gets in contact with a plurality of elements and components of the coating machine.

The coating machine includes a coating station in which liquid chocolate mass freely flows down onto the articles. In many cases, the coating machine also includes a bottom coating station with which the bottom side of the articles is coated. Furthermore, the coating machine usually includes a fan for blowing off surplus chocolate mass from the coated articles. It is to be understood that masses other than chocolate mass, for example fat containing masses, other coating masses, caramel masses and the like, may also be processes with such a coating machine.

Especially, coating machines need to be cleaned before a mass change. A mass change in a coating machine is to be understood as a situation when the kind of the mass to be processed in the coating machine changes. For example, a dark chocolate has previously been processed, and the following articles are to be coated with a light chocolate or even a white coating mass. During such a mass change, there is the problem of having to remove the previously processed mass from the coating machine and to clean all elements of the machine which were contacted by the mass to be able to introduce the new mass without undesired mixture of the masses.

BACKGROUND OF THE INVENTION

For conducting such a mass change, it is generally known in the art of coating machines in the confectionary industry to heat up the coating machine with the previously processed mass and to empty the coating machine by discharging the previously processed mass by a return pump. After having pumped off the previously processes mass, the interior of the coating machine and the aggregates being arranged therein are mechanically cleaned as far as they are accessible. This means that remainders of the mass are manually removed by a tool, for example by a flat trowel. This cleaning process takes a lot of time, and depending on the accessibility of the interior, it may be very exhausting for the staff. Furthermore, the coating machine is only pre-cleaned to some extent such that a second cleaning step is required. During this second cleaning step, either water or cocoa butter is used. It is known to clean coating machines with water. For this purpose, a commonly available handheld pressure washing device is used while the coating machine is not operated. The pressure washing device includes a nozzle through which water is sprayed onto the aggregates of the coating machine. The remainders of the mass sticking to the aggregates are removed due to the pressure of the applied water. This cleaning step practically also is a mechanical method, and it is only successful as far as the aggregates are accessible. The water being sprayed by the pressure washing device is hot, but it cools down comparatively quickly after having left the nozzle, and in summary it is not capable of substantially heating up the aggregates and elements of the coating machine. Places of the coating machine which are hard to be accessed, for example the bottom side of shafts, bars and the like, are only partly reached, and they are thus not sufficiently cleaned. Due to the spraying of water with pressure, the mass to be removed is also distributed onto other aggregates of the coating machine and into places which are not accessible. The use of water also requires drying afterwards. Furthermore, it is a drawback that the water consumption of the pressure washing device is respectively high since the water being applied by spraying flows out off the coating machine and thus cannot be reused. Accordingly, a water discharge needs to be located below the coating machine. The use of a pressure washing device requires that it is continuously fed with heated water such that respectively high energy consumption is unpreventable. The cleaning staff who manually conducts the cleaning operation has to be protected from the rebounding water by respective clothing and safety goggles. This way of pressure washing is also disadvantageous in the sense of reducing the lifetime of bearings of shafts and other aggregates of the coating machine since the lubricant being contained in the bearings is at least partly removed by the pressurized water.

To counteract these drawbacks of the known handheld pressure washing device operating with water, it is also known in the art of coating machines in the confectionary industry to introduce a washing mass, for example cocoa butter or a different fat solution, into the coating machine. The coating machine is then started without articles passing through it such that the washing mass is continuously circulated, and it flows through a coating station, for example. In this way, the washing mass reaches a substantial portion of the elements of the coating machine being soiled with the previously processed mass, and these parts are more or less cleaned by melting the mass. However, not all elements of the coating machine are reached by the washing mass such that the cleaning effect is not perfect. At the end of the cleaning process of the coating machine, the washing mass is removed from the coating machine, and it may be further processed in the normal chocolate production. In the following, the new coating mass may be introduced.

Furthermore, it is known in the art of coating machines in the confectionary industry to design substantial elements of the coating machine to be made of stainless steel and to conduct wet cleaning using hot water under pressure after having removed the previous mass from the coating machine. Such a wet cleaning operation has various drawbacks. When applying a spraying jet of hot water onto the grating belt, there is a substantial spraying and distribution effect such that the aggregates being located below the upper part of the grating belt are only reached to a small extent. Due to the hot water necessarily being introduced into the coating machine, there is a contamination which results in increased growth of bacteria. To counteract this danger, it is known to conduct a drying operation after the cleaning operation with hot water, the drying operation using a jet of hot air. The elements of the machine are heated in this way, and the drying operation needs to be conducted over a respectively long period of time. However, not all parts are actually dried, and it is not possible to check whether or not all elements which had been contacted by hot water have actually been dried.

For a mass change to be conducted in a coating machine, it is also generally known in the art of coating machines in the confectionary industry to cut open the grating belt in a direction transverse to its moving direction and to open the loop formed by the grating belt in this way such that the aggregates being located below the upper part of the grating belt are accessible for cleaning. Once again, washing masses are used for cleaning. The washing masses may be cocoa butter or hot water, for example. Accordingly, cleaning is comparatively complicated, complex and insecure. Especially, the cut open grating belt has to be reassembled after cleaning which takes a substantial period of time.

A method for cleaning a coating machine and a cleanable coating machine are known from German Patent Application No. DE 198 48 766 A1 corresponding to U.S. Pat. No. 6,348,105 B1. The known coating machine includes a frame and a grating belt serving to support the articles to be coated. The grating belt is arranged within the frame to be rotatingly driven therein. The grating belt is guided by deflecting elements. A tub including a heatable double casing is located below the grating belt. The tub is also located below all common aggregates such as a bottom wall station including a dipping box and a vibrating apparatus. Such a coating machine usually includes side walls which are covered by cover sheets at their upper ends. The working width of the coating machine is realized between the side walls as it corresponds to the grating belt width. A roof structure is located above the grating belt plane. The structure continuously extends over the entire length and width of the coating machine in a roof-like configuration. A curtain box, a fan for blowing off surplus mass from the articles being located on the grating belt and possibly additional elements, such as a control unit and the like, are located in the region of the structure. For cleaning such a coating machine, water is filled into the tub, the water having a temperature above the melting temperature of the coating mass. The water is applied onto the aggregates to be cleaned by one or more pumps and one or more hoses in substantially pressureless circulation. The washing water circulates within the circuit with no pressure, and it is directed onto the aggregates to be cleaned in a washing process, the mass being located at these aggregates being melted. The temperature of the coating machine is maintained by the heated double casing. The distribution of the hot water is realized by hand depending on the degree of pollution of the respective aggregates. The remainders of the mass sticking to the aggregates are being melted, and they reach the water in their melted condition, the water being circulated, meaning the usually used discharge of the tub is closed during the cleaning operation. The cleaning and washing operation is conducted until substantial cleaning has been achieved. The period of time during which the washing and cleaning operation is realized depends on experience values which may also depend on the mass. Efficiency of the known cleaning process and its duration strongly depend on how carefully the staff manually operates the washing and cleaning process. The most important aggregates to be cleaned are driven during the washing and cleaning process. After the washing and cleaning process has been completed, a drying process may be conducted. During the drying process, the double casing is still heated and the fan of the coating machine is used for blowing air onto the aggregates and through the grating belt.

Another coating machine is known from German Patent No. DE 42 43 814 C1 corresponding to U.S. Pat. No. 5,437,723. The machine elements of the known coating machine are cleaned during a mass change by a washing mass at increased safety and improved accessibility of the aggregates being located below the upper part of the coating machine. For this purpose, the known coating machine includes a tensioning device having an increased tensioning path allowing for lifting of the grating belt. The coating machine includes elements for supporting the lifted grating belt. Especially, these elements are designed as supports for supporting carriers being arranged at the frame of the coating machine. In this way, the grating belt is designed to be lifted and to be supported in its lifted position, especially by supports and carriers, such that the aggregates being located below the upper part of the grating belt may be directly accessed for cleaning with a washing mass such that cleaning is easier, simpler and faster at increased safety. For example, the aggregates located below the upper part of the grating belt may be a vibrating device, a bottom wall station, a bottom roller and the like. Thus, the grating belt is designed to be lifted in a way that the aggregates being located below the lifted grating belt are freely accessible from the side. In the lifted position, there is a distance of approximately 20 cm to 30 cm between the lifted part of the grating belt and the surface of the aggregates such that the washing mass may be directly directed on to the aggregates to be cleaned by nozzles without spraying effects occurring at the grating belt. On the other hand, it is especially preferred to use cocoa butter instead of hot water as the washing mass to counteract the danger of contamination.

SUMMARY OF THE INVENTION

The present invention relates to an apparatus for cleaning a coating machine for coating confectionery products with a coating mass. The apparatus is designed to be arranged in a coating machine including a rotatingly driven grating belt. The grating belt is designed and arranged to support confectionery products to be coated. The grating belt defines a grating belt plane. The apparatus includes a cart. The cart is designed to be moved back and forth in the coating machine above the grating belt plane in the mounted position of said cart in the coating machine. The cart includes a plurality of spraying nozzles. The spraying nozzles are designed and arranged to spray pressurized hot water onto the coating machine in an automatically controlled way.

The present invention also relates to a cleanable coating machine for applying a coating mass onto confectionery articles. The cleanable coating machine includes a grating belt being designed and arranged to be rotatingly driven, to support confectionery articles to be coated and to move the confectionery articles through the coating machine. The grating belt defines a grating belt plane. The coating machine further includes a cleaning apparatus including a cart. The cart is designed to be moved back and forth within the coating machine above the grating belt plane. The cart includes a plurality of spraying nozzles. The spraying nozzles are designed and arranged to spray pressurized hot water at least onto the grating belt in an automatic way.

The present invention also relates to a method of cleaning a coating machine for applying a coating mass onto confectionery articles. The method includes the step of spraying pressurized hot water at least onto a grating belt of the coating machine in an automatically controlled way.

With the novel method and apparatus for cleaning a coating machine, it is possible to thoroughly clean the aggregates and machine elements of the coating machine with hot water in a very reliable way. The novel method is based on the concept of no longer manually operating the cleaning process which then depends on the care of the staff, but instead to conduct it automatically by a mechanical apparatus. Furthermore, instead of pressureless circulation of a cleaning mass resulting in melting during the washing and cleaning operation, meaning an impact with respect to temperature, one additionally realizes a spraying operation which introduces mechanical energy. It is to be understood that the hot water being used for cleaning has a temperature which is higher than the melting temperature of the mass to be removed. The pressurized cleaning jet of water is directed onto the aggregates to be cleaned in a controlled way. Thus, the direction of the cleaning jet is also mechanically determined such that it does not depend on the care taken by the staff.

Especially, a cart being designed and arranged to be movable back and forth and including a plurality of spraying nozzles is used for this purpose. The cart is located at some distance above the grating belt to be movable such that the jets or streams exiting from the spraying nozzles reach all aggregates and elements of the coating machine to be cleaned located below the grating belt plane and/or the side walls. The novel automatic cleaning process uses an approximately constant distance between the spraying nozzles and the respective aggregate. The spraying nozzles of the cart are arranged such that portions of the side walls may also be reached. Such portions of the side walls are especially polluted by chocolate and other coating masses being distributed onto the side walls when removing surplus mass from the articles by blowing. The hot water is applied in a pressurized condition. The pressure is produced by a respective pump.

The cart may be moved with different velocities in different sections. Usually, the cart is designed and arranged such that it extends over the working width and such that it is moved in the direction of movement of the grating belt and in an opposite direction, respectively, within a rectangular field. In the simplest embodiment, the cart is manually moved. However, preferably, there is a drive for the cart, the drive including an electric motor, a pneumatic motor, a hydraulic motor and the like. The cart is guided and supported in a horizontal plane. It is also possible to use a drive using pneumatic cylinders. Different velocities may be used to move the cart within severely polluted regions of the coating machine at a decreased velocity or to even plan or determine standstill times. Due to automatically applying spraying jets of water at a predetermined direction with respect to the aggregates to be cleaned, one attains great safety and reliability of the cleaning operation. Thus, one no longer depends on the care being taken by the staff manually cleaning the coating machine. The velocity of the cart can be controlled in response to the mass to be removed and to respective experience values during mass changes.

The novel apparatus for cleaning a coating machine for processing chocolate mass and similar masses with hot water includes a cart including a plurality of spraying nozzles. The cart is located above the grating belt plane at such a distance that the water jet exiting from the spraying nozzles can not only reach the entire upper part of the grating belt, but also the other aggregates of the coating machine tending to get polluted and being located below the grating belt plane. Preferably, the spraying nozzles of the cart are downwardly directed, and they are connected to a circuit for hot water including a pump. Alternatively, hot fresh water may be used. In both cases, the orientation of the spraying jets is determined if the spraying nozzles of the cart are arranged in a stationary way at a predetermined orientation. It is preferred to arrange the spraying nozzles in the form of a plurality of spraying bars extending over the working width of the coating machine at different angles of orientation to prevent dead centers occurring at the aggregates to be cleaned which could not be reached by the spraying jets. However, it is also possible to arrange the spraying nozzles to be movable and to change the orientation of the spraying jets in a controlled way, for example to reach almost the entire circumference of the tensioning roller of the grating belt drive. Usually, the pump is connected to a circuit for hot water to reduce the consumption of water. This means that a closed circuit for hot water is formed, the circulating water being driven by the pump. However, it is also possible to connect the pump to an external water supply for hot water, for example an already existing supply for fresh hot water, such that one then operates with the fresh hot water.

Usually, the cart includes its own drive. Especially, the drive includes an electric motor. There is a control unit for controlling the drive of the cart and the pump being located in the circuit. In this way, it is possible to equip the control apparatus with a washing and cleaning program or to design it to be programmable in a way to affect the washing and cleaning process. Special places which tend to increased pollution with coating mass can be washed and cleaned as desired, while the drive of the cart moves the cart in a way back and forth at a comparatively greater velocity to pass such places which tend to get less polluted. Velocities in a range of a plurality of centimeters per second may make sense. It is also possible to program standstill times. The inversion of the direction of movement of the cart may be realized by end switches or in a controlled way by the control unit, for example.

Usually, the cart with its spraying bar extends over the working width, and it is moved back and forth in the moving direction of the grating belt and against it, respectively. The movement is coordinated in a way that the entire portion to be cleaned located above the tub is reached by the jets of water. In a preferred exemplary embodiment, the cart includes four wheels which are supported on the cover sheets of the side wall covers located in an upper region. The four wheels define a plane, the spraying nozzles being arranged with respect to the plane at the required angle of inclination. The control unit for the drive is designed to be controllable with respect to the position it reaches at a certain point in time and/or it is programmable such that the cleaning process can be individually coordinated to the separate aggregates to be cleaned. The control unit for controlling the drive preferably is supplied by the control apparatus for actuating the elements of the coating machine being located in the roof portion of the coating machine. The movable cart including its support usually is associated with the respective coating machine. Furthermore, it is possible that the pump as well as filters, valves and connections are located at the coating machine, especially in a region below the tub of the coating machine. In this way, the coating machine is combined with the novel cleaning apparatus. However, it is also possible to combine major components of the apparatus to form a separate structural unit with which different coating machines may be alternately cleaned as required. Preferably, the pump for the circulation of the washing and spraying water is located in such a separate unit. This also applies to a large filter, a fine filter and a plurality of valves. A heating unit for heating the circulating washing water may also be part of the separate unit. The movement of the movable cart as well as spraying of the spraying jets may be realized in an intermittent way or a pulsing way. Usually, continuous spraying if preferred. However, the spraying and cleaning process may also be conducted to be controlled with respect to time and movement. The cart includes spraying nozzles which are directed in a downward direction, and it may further include upwardly directed spraying nozzles. The downwardly directed spraying nozzles are preferably connected to a circuit for circulating hot water, while the upwardly directed spraying nozzles preferably are connected to fresh water. The upwardly directed spraying nozzles serve to clean the bottom side of the roof-like structure of the coating machine as well as the side walls. The elements being located above the grating belt plane are mostly less soiled. Thus, the upwardly directed spraying nozzles are not necessarily required. Especially, the nozzles are arranged at the cart at a transverse orientation. By arranging a plurality of nozzle bars, one may produce spring jets of different orientations with which a preferably great portion of the surface of the aggregates to be cleaned is directly reached. The spraying nozzles in the form of nozzle bars preferably are arranged at the front and at the rear of the cart to make use of as much of the moving path above the tub as possible.

The spraying nozzles of the cart may also be designed to be connectable to a supply for drying air. In this way, a drying process may be conducted after the washing and cleaning process, the drying process using hot air for drying. During drying, substantial air velocities are attained. The fan which usually is part of the coating machine may also be used for the drying process. Heating of the coating machine in the region of the tub by a double casing further serves to introduce heat to the aggregates of the coating machine such that the aggregates are dried by heat.

The novel method and apparatus have many advantages. The washing, cleaning and drying process may be conducted in an automatic way which results in great reliability. The washing and cleaning steps may be controlled in an automatic way in a way similar as it is known from dish washers. Furthermore, it is advantageous that the consumption of hot water is reduced, especially in case one uses circulating water. The required period of times for washing are decreased due to the automation. Depending on the case of application, washing times in a range of approximately between 1 to 2 hours may be realized. It is to be understood that cleaning substances, fat solvents, emulsifiers, clear rinsing agents and other substances may be added to the hot water as desired such that the steps occur in a programmed way similar to a washing machine, a dish washer and the like.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
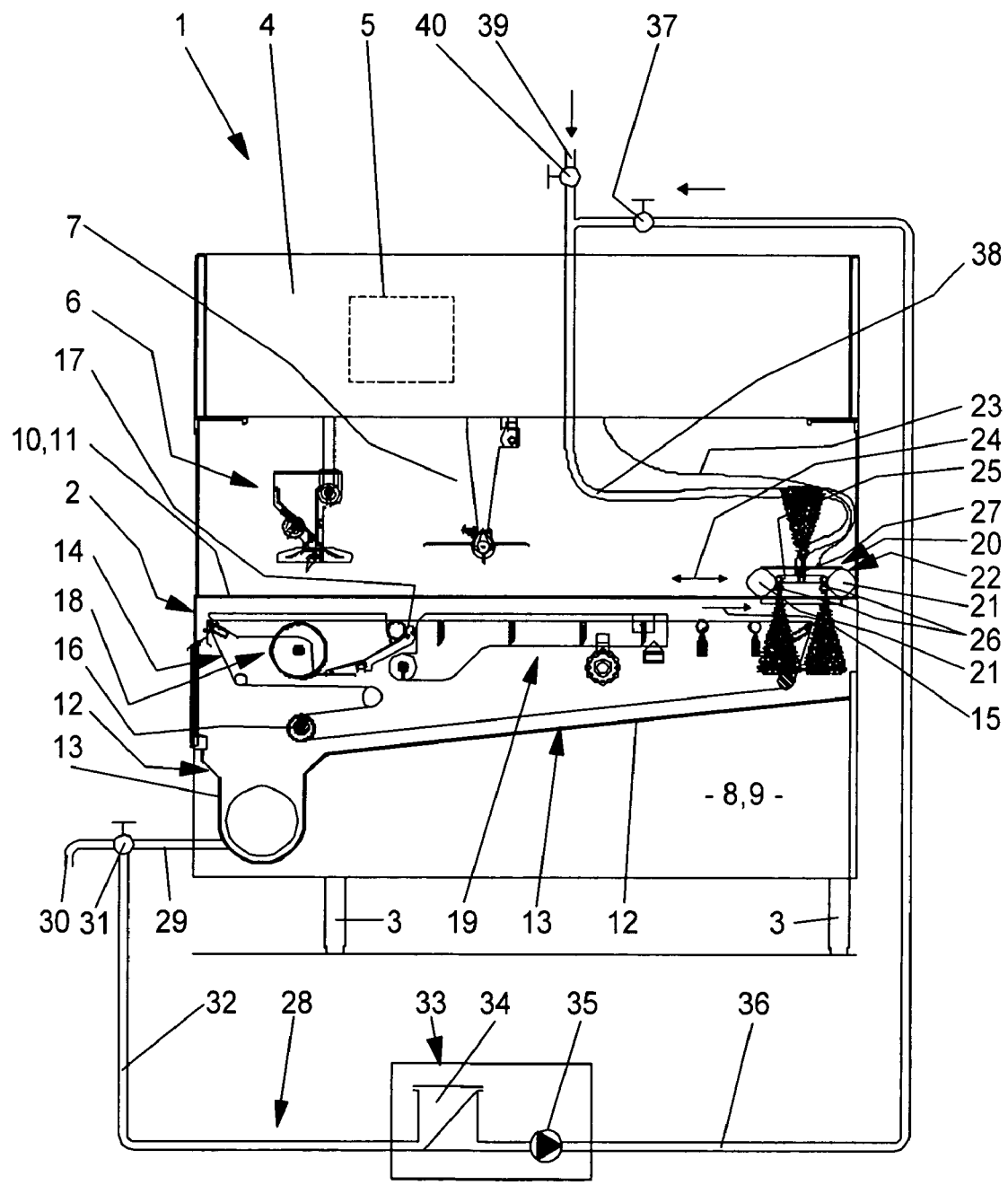
FIG. 1 is a schematic side view of a first exemplary embodiment of a novel coating machine and of a cleaning apparatus.

Referring now in greater detail to the drawings, FIG. 1 schematically illustrates a side view of a novel coating machine 1. Visible and invisible edges are generally illustrated in the same way. The coating machine 1 includes a frame 2 which at its lower end is supported on legs 3 and which in its upper portion includes a bridge 4 which may be used to arrange an electronic control unit 5. The bridge 4 also serves to mount a curtain box 6 and a fan 7. The fan 7 serves to blow off surplus coating mass from the articles to be coated in a way generally known in the art.

The lower portion of the frame 2 of the coating machine 1 includes two side walls 8 and 9 being located at the right hand side and at the left hand side, respectively, and parallel to the working direction of the coating machine 1, meaning the direction in which the articles to be coated are transported through the coating machine 1. The side walls 8 and 9 serve to support and arrange a plurality of aggregates. The side walls 8 and 9 at their upper end each include a cover sheet 10, 11. A tub 12 is located between the side walls 8 and 9. The tub 12 includes a double casing 13 being connected to a heating circuit for water. The heating water flowing through the double casing 13 serves to heat up the coating machine 1 and its various aggregates to counteract undesired solidification of the coating mass.

The coating machine 1 further includes a grating belt 14 which is guided by and about various deflecting rollers, knife edges and a tensioning roller according to arrow 15. The grating belt 14 is rotatingly driven by a driving roller 16 being driven by a motor (not illustrated). The motor and the driving roller 16 are controlled by the electronic control unit 5. The upper portion of the grating belt 14 defines a grating belt plane 17. A bottom wall station 18, a vibrating apparatus 19 and possibly additional wiping rollers and other aggregates are located below the upper portion of the grating belt 14 and thus below the grating belt plane 17. Such aggregates are to be understood herein as all elements being located below the grating belt plane 17 at which coating mass may deposit and which need to be cleaned from coating mass, especially when changing the kind of the mass to be processed in the coating machine 1. Especially, the aggregates include the grating belt 14, all deflecting rollers, the driving roller and the tensioning roller as well as possibly a bottom wall station 18 and a vibrating apparatus 19. All the mentioned aggregates are located between the grating belt plane 17 and the tub 12. In other words, the tub 12 surrounds these aggregates from below such that coating mass dripping down is collected in the tub 12. The coating mass flows through the circuit in a known way, and it flows down onto the articles to be coated from the curtain box 6. The articles are not illustrated in the drawings. However, it is to be understood that they are supported on the upper part of the grating belt 14 and that they are transported from the entrance side illustrated on the left hand side of FIG. 1 through the coating machine 1 to exit at the right hand side. It is to be understood that feeding and discharging belts (not illustrated) are located next to the upper part of the grating belt 14, these belts also being designed and arranged to transport the articles.

A car, a carriage or a cart 20 is located above the grating belt plane 17 at a predetermined distance thereto. The cart 20 includes axles or shafts continuously extending over the working width. Wheels 21 are arranged at the ends of the axles. Two of the four wheels 21 are supported on the cover sheet 10 and the other two wheels 21 are supported on the cover sheet 11. The cart 20 includes a drive shaft and a drive 22 for example in the form of a motor (not illustrated) which is also controlled by the electronic control apparatus 5. Electric supply and control of the cart 20 is realized by an electric line 23. In this way, the cart 20 may be driven back and forth in the plane being determined by the cover sheets 10 and 11. The cart 20 includes a chassis 25 including spraying nozzles 26 which are directed in a downward direction. The downwardly directed spraying nozzles 26 are designed to form a spraying strip or a nozzle strip extending along the working width. The spraying nozzles 26 may be arranged to face downward in an approximately perpendicular direction, meaning a vertical direction. However, it is also possible to arrange the spraying nozzles 26 to be slightly declined to prevent dead centers occurring at the aggregates to be cleaned. The spraying nozzles 26 may also be designed and arranged to be adjustable in a controlled way to reach certain angle positions to allow for full cleaning of the aggregates. It is also possible to arrange upwardly directed spraying nozzles 27 at the chassis 25 to clean the elements being located above the grating belt plane 17. Especially, the spraying nozzles 27 serve to spray cleaning water onto the bottom side of the bridge 4 and of the elements located at that place, especially the curtain box 6 and the fan 7. The cart 20 is moved back and forth according to arrow 24 by its drive 22 such that all aggregates to be cleaned being located above the tub 12 are actually cleaned. The stroke of movement of the cart 20 preferably covers the entire length of the coating machine 1. However, it is ensured that the water exiting from the spraying nozzles 26 reaches the tub 12 to be collected in the tub 12.

The supply of the cart 20 with hot water is realized by a circuit 28. A piece of a conduit 29 is part of the circuit 28, the piece 29 starting at the lowest point of the tub 12 and leading to a water discharge 30. The polluted cleaning water can be discharged through the water discharge 30 after completion of the washing and cleaning process. A valve 31 is located in the conduit piece 29. Another conduit piece 32 leads from the valve 31 to an apparatus 33. The apparatus 33 is designed as a separate element which is not part of the coating machine 1. The apparatus 33 may include a movable frame on which a filter 34 and a pump 35 may be located. A conduit piece 36 leads from the pump 35 into a conduit piece 38 via a valve 37. The conduit piece 38 leads to the cart 20 and thus to the spraying nozzles 26 and/or 27. It is to be understood that at least a part of the conduit pieces 29, 32, 36 and 38 may be designed as movable hose conduits. Fresh cold or hot water can be introduced into the circuit 28 via a fresh water conduit including a valve 40. The circuit 28 and the tub 12, respectively, can be filled until they reach a predetermined water level. In case an internal hot water supply is arranged, connection to the fresh water conduit 39 can be realized to initially begin the washing operation with hot water. However, it is also possible to arrange respective heating units, especially such ones using the double casing 13, allowing for heating or partial heating of the water.

Preferably, the washing and cleaning operation takes place as follows:

At first, liquid coating mass still contained in the tub 12 is discharged via the water discharge 30. In the following, the position of the valve 31 is changed and the tub 12 is filled with hot water. The filling process can be stopped by a level sensor (not illustrated). The filling level is approximately located in the region of the driving roller 16. The circuit 28 is closed by respective switching of the valves 31, 37 and 40 and the water starts flowing through the circuit 28 as it is moved by a pump 35. Such a washing and cleaning process can be controlled by the control unit 5. The cart 20 is also controlled by the control unit 5 to start moving, the cart 20 moving along the entire length of the coating machine 1 according to arrow 24. Preferably, the movement can include different sections of movement in which the cart 20 moves at different velocities as it is required for cleaning the aggregates onto which the spraying water is to be distributed. It is also possible to program standstill times of the cart 20. The period of time during which such a washing and cleaning process takes place can also be programmed and it can be adjusted to certain values based on experience to adapt to different masses.

It makes sense to initially only supply the downwardly directed spraying nozzles 26 with washing water from the circuit 28 and to thus clean the part of the coating machine 1 which is located below the grating belt plane 17. After having cleaned the aggregates being located below the grating belt plane 17, the washing water being contained in the circuit 28 is discharged together with the detached coating mass through the water exit 30. It is also possible to backwash the filter 35.

For cleaning the elements being located above the grating belt plane 17, the upwardly directed spraying nozzles 27 are supplied with cleaning water. This may be either realized by providing a circuit 28 of hot water. However, it is also possible to only conduct cleaning of the upper elements with fresh hot water which is supplied by the fresh water conduit 39 and a pump (not illustrated).

Figure 2:
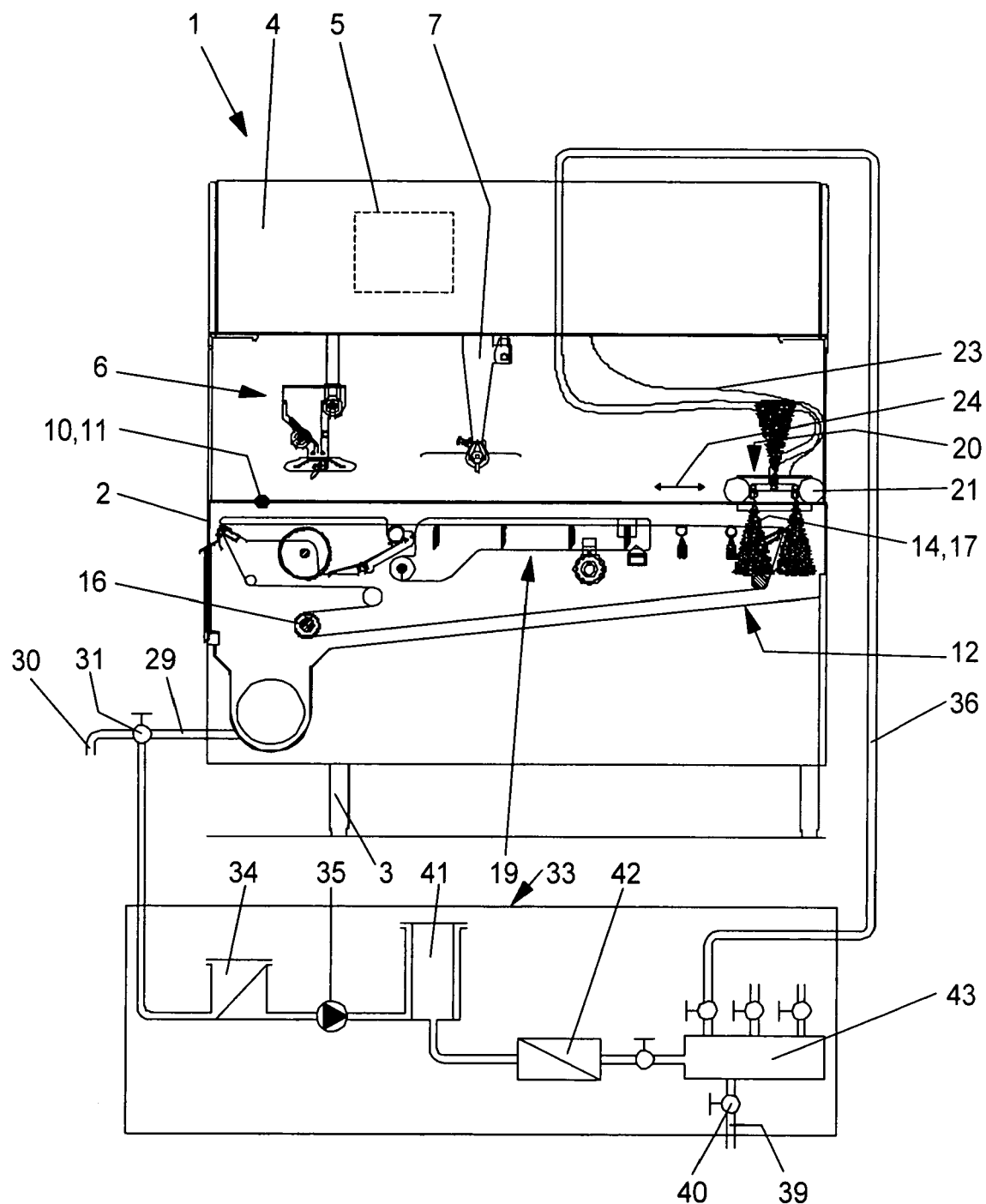
FIG. 2 is a schematic side view of a second exemplary embodiment of the novel coating machine and of a cleaning apparatus.

The exemplary embodiment of the novel coating machine 1 illustrated in FIG. 2 has many features in common with the embodiment illustrated in FIG. 1. Consequently, it is referred to the above description with respect to all common aspects.

In contrast, the apparatus 33 has a design which is slightly more complex. The apparatus 33 is designed as a movable module which can be used in and connected to different coating machines 1 in an alternating way in a way that it is used wherever a change of the coating mass is required. The apparatus 33 also includes a filter 34. The filter 34 is designed as a large filter. A fine filter 41 is also arranged, the fine filter 41 being located downstream of the pump 35. An electric heating unit 42 serves to heat the washing water in the circuit 28 as well as to keep the circling washing water warm. The fresh water conduit 39 with the valve 40 is directly connected to a distributing element 43.

Figure 3:
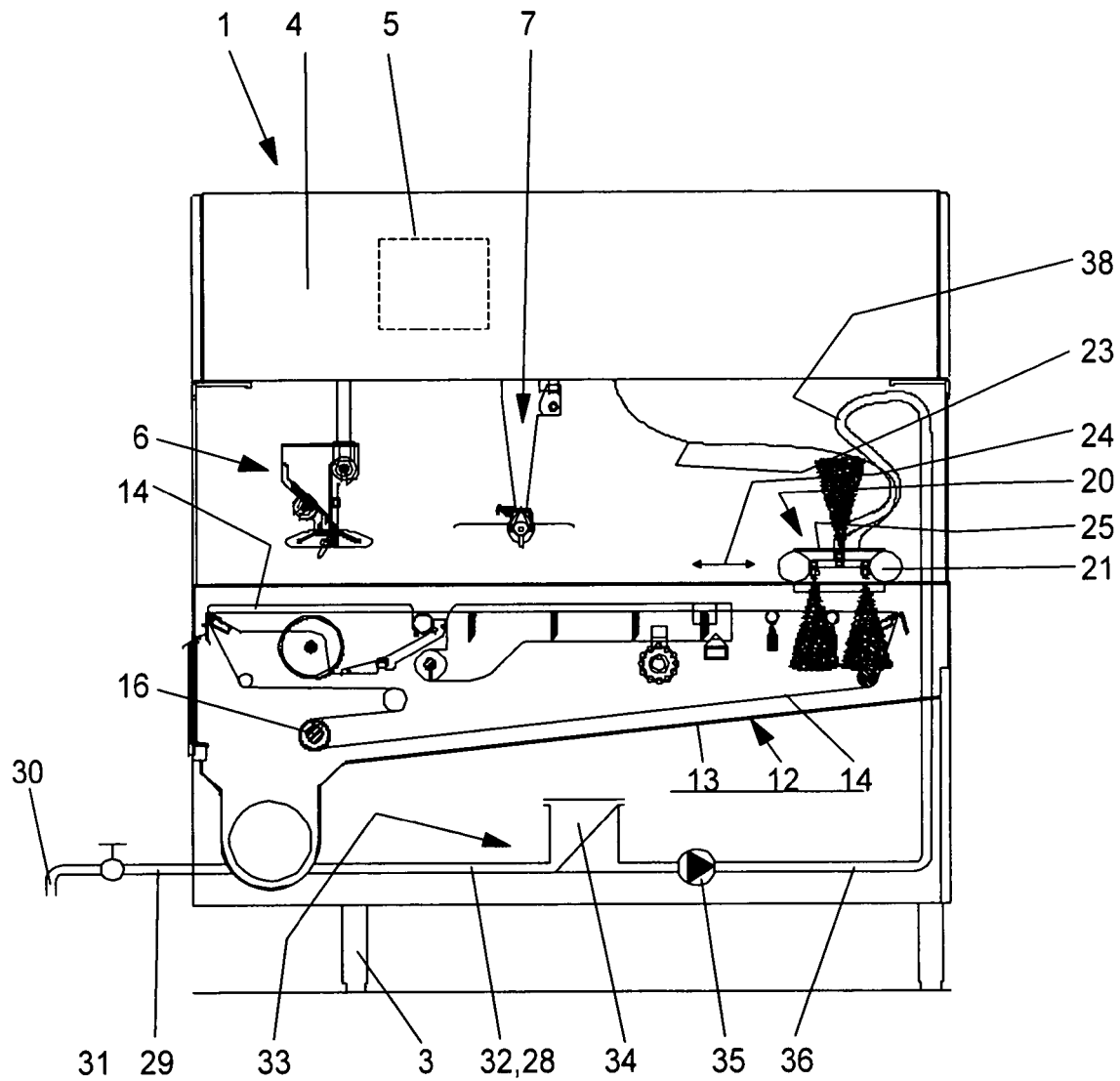
FIG. 3 is a schematic side view of a third exemplary embodiment of the novel coating machine and of a cleaning apparatus.

FIG. 3 illustrates another exemplary embodiment of the novel coating machine 1. Especially, it is to be seen from FIG. 3 that the apparatus 33 may also be associated with one single coating machine 1 in a way that it is located below the tub 22 in a stationary way. It is to be understood that the various conduit pieces of the circuit 28 may also be arranged and mounted in a stationary way with the exception of the movable conduit piece 38 which has to adapt to the movement back and forth of the cart 20.

The wheels 21 of the cart 20 are designed and arranged to be movable on the cover sheets 10 and 11. It is to be understood that the linear movement of the cart 20 may also be realized in a different way, for example by using gear wheels on toothed racks, guiding bars and a drive for the reciprocating movement of the cart 20. Especially, the drive may be designed to be pneumatic. The cover sheets 10 and 11 may also be designed and arranged to include edges protruding at an angle to provide a slide path for guiding the cart 20 to ensure that the cart 20 is always centered with respect to the longitudinal axis of the coating machine 1.

Figure 4:
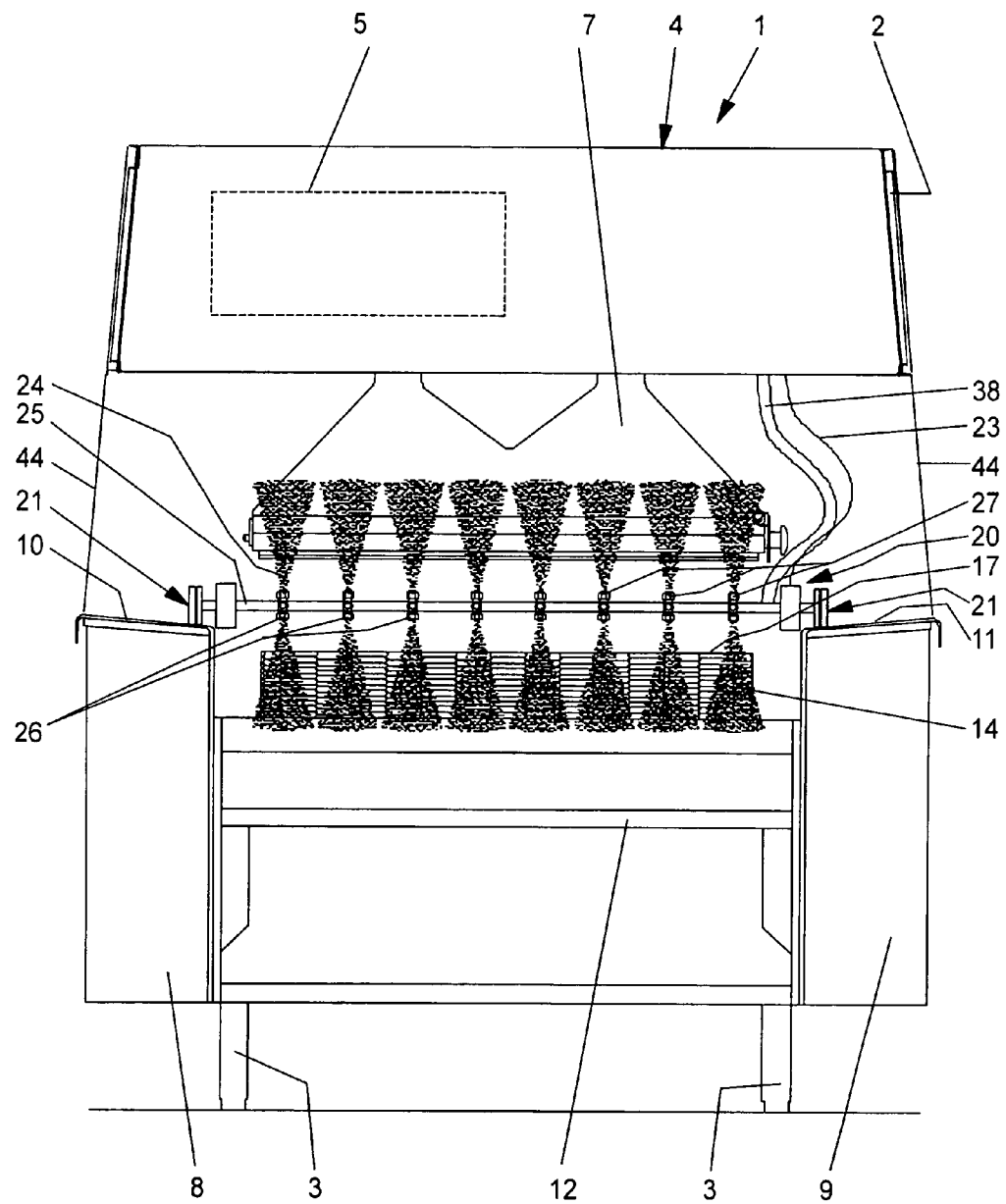
FIG. 4 is a schematic rear view of the novel coating machine and of a cleaning apparatus.

FIG. 4 illustrates a front surface of the coating machine 1 as seen from the exit side. The width of the side walls 8, 9 compared to the width of the tub 12 is to be seen from FIG. 4. The cover sheets 10, 11 are not located to be horizontal, but to instead be declined in an inward direction. In this way, they are located next to the grating belt plane 17 in a cavity-like way which is decorative. On the other hand, they have a positive influence on cleaning water coming from the upwardly directed nozzles 27 flowing down into the tub 12. A great portion of the cleaning water flows down at the inside of flap elements 44 being made of transparent plastic material. The flap elements 44 are located between the bridge 4 and the cover sheets 10 and 11, respectively, during the washing operation in the closed position. It is also to be seen in FIG. 4 that all aggregates to be cleaned being located below the grating belt plane 17 between the side walls 8, 9 are reached by the spraying water coming form the downwardly directed nozzles 26.

Many variations and modifications may be made to the preferred embodiments of the invention without departing substantially from the spirit and principles of the invention. All such modifications and variations are intended to be included herein within the scope of the present invention, as defined by the following claims.

I claim:

1. A cleanable coating machine for applying a coating mass onto confectionery articles, comprising:
   a grating belt, said grating belt being designed and arranged to be rotatingly driven, to support confectionery articles to be coated and to move the confectionery articles through said coating machine, said grating belt defining a grating belt plane that is coincident with a top surface of said grating belt; and
   an automated cleaning apparatus, said cleaning apparatus including a cart positioned above the grating belt plane, said cart being designed to be moved back and forth within said coating machine above the grating belt plane, said cart including a plurality of spraying nozzles that face downward from the cart toward said grating belt so as to be arranged to spray pressurized hot water at least onto said grating belt.

2. The cleanable coating machine of claim 1, further comprising a circuit including a pump designed and arranged to circulate hot water, wherein said spraying nozzles are connected to said circuit for hot water.

3. The cleanable coating machine of claim 1, further comprising a fresh water connection, wherein said spraying nozzles are connected to said fresh water connection.

4. The cleanable coating machine of claim 2, further comprising a drive and a control unit, said drive being designed and arranged to move said cart back and forth in said coating machine, said control unit being designed and arranged to control said drive and said pump of said circuit.

5. The cleanable coating machine of claim 4, wherein said control unit is designed and arranged to control said drive in a way that said cart is located at predetermined place at a predetermined point in time.

6. The cleanable coating machine of claim 1, further comprising a plurality of second spraying nozzles, said second spraying nozzles facing in an upward direction from said cart.

7. The cleanable coating machine of claim 6, wherein said spraying nozzles facing downward are connected to a circuit for hot water and said second spraying nozzles facing in an upward direction are connected to a fresh water connection.

8. The cleanable coating machine of claim 1, wherein said spraying nozzles are arranged in a plurality of rows, each of said rows extending over a working width of said coating machine at a different angle of inclination.

9. The cleanable coating machine of claim 6, wherein said spraying nozzles are arranged in a plurality of rows, each of said rows extending over a working width of said cleaning apparatus at a different angle of inclination.

10. The cleanable coating machine of claim 6, wherein said spraying nozzles are designed and arranged to be supplied with drying air.

11. The cleanable coating machine of claim 1, wherein said cart further includes an axle that extends across a working width of said coating machine and wheels arranged at the ends of said axle, said axle and wheels facilitating movement of said cart through said coating machine.

12. The cleanable coating machine of claim 11, further comprising opposed cover sheets that support said wheels of said cart.

13. The cleanable coating machine of claim 11, wherein said cart further includes a drive and a drive shaft that together drive said cart.

14. The cleanable coating machine of claim 13, wherein the drive comprises a motor.

15. The cleanable coating machine of claim 13, wherein the drive is pneumatic.

16. A cleanable coating machine comprising:
   a frame;
   a grating belt positioned within the frame and having a top surface adapted to support confectionery articles to be coated with a coating;
   a cart positioned within the frame above the grating belt, the cart including:
      a chassis,
      a plurality of downwardly facing spraying nozzles supported by the chassis that spray cleaning liquid downward toward the grating belt,
      an axle supported by the chassis that extends across a working width of the grating belt, the axle having opposed ends that each supports a wheel, and
      a drive that drives the cart within the coating machine;
   opposed surfaces that support the cart wheels as the cart moves within the coating machine; and
   an electronic control unit that provides control signals to the drive to automatically control movement and positioning of the cart within the coating machine.

17. The cleanable coating machine of claim 16, wherein the spraying nozzles are arranged in multiple independent rows.

18. The cleanable coating machine of claim 17, wherein the spraying nozzles of each row are directed at a different angle relative to the grating belt.

19. The cleanable coating machine of claim 16, wherein the cart further includes upwardly facing spraying nozzles supported by the chassis and adapted to spray cleaning liquid upward from the cart.

20. The cleanable coating machine of claim 16, wherein the drive comprises a motor.

21. The cleanable coating machine of claim 16, wherein the drive is pneumatic.

22. The cleanable coating machine of claim 16, further comprising a pump that pumps the cleaning liquid to the spraying nozzles.

23. The cleanable coating machine of claim 16, further comprising a heating unit that heats the cleaning liquid supplied to the spraying nozzles.

* * * * *